US009806802B2

(12) United States Patent
Huang et al.

(10) Patent No.: US 9,806,802 B2
(45) Date of Patent: Oct. 31, 2017

(54) METHOD AND DEVICE FOR DETECTING ROGUE BEHAVIOR (71) Applicant: ZTE Corporation, Shenzhen (CN)

(72) Inventors: Jian Huang, Shenzhen (CN); Jinshu Lu, Shenzhen (CN); Wenjie Huang, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 0 days.

(21) Appl. No.: 15/114,239

(22) PCT Filed: Jul. 22, 2014

(86) PCT No.: PCT/CN2014/082762
§ 371 (c)(1),
(2) Date: Jul. 26, 2016

(87) PCT Pub. No.: WO2015/109793
PCT Pub. Date: Jul. 30, 2015

(65) Prior Publication Data
US 2017/0005722 A1  Jan. 5, 2017

(30) Foreign Application Priority Data
Jan. 26, 2014  (CN) .......................... 2014 1 0037688

(51) Int. Cl.
H04B 10/00 (2013.01)
H04B 10/079 (2013.01)
(Continued)

(52) U.S. Cl.
CPC ..... H04B 10/0791 (2013.01); H04B 10/0795 (2013.01); H04B 10/27 (2013.01);
(Continued)

(58) Field of Classification Search
USPC ...................................... 398/66–73
See application file for complete search history.

(56) References Cited

U.S. PATENT DOCUMENTS 7,881,607 B2 * 2/2011 DeLew ............. H04B 10/0799
398/17
9,025,949 B2 * 5/2015 Khotimsky .......... H04B 10/032
398/1
(Continued)

FOREIGN PATENT DOCUMENTS

CN    101005317 A    7/2007
CN    101127566 A    2/2008
(Continued)

OTHER PUBLICATIONS

International Search Report for corresponding No. PCT/CN2014/082762 filed on Jul. 22, 2014; dated Sep. 28, 2014.

Primary Examiner — Agustin Bello
(74) Attorney, Agent, or Firm — Cantor Colburn LLP (57) ABSTRACT The disclosure provides a method and device for detecting rogue behaviour. The method comprises: for the upstream optical signal of each Passive Optical Network (PON) port, an Optical Line Terminal (OLT) constructs a short timeslot and transmits it via an optical transceiver; the OLT controls the optical transceiver to conduct a first Signal Detect (SD) sampling detection on the upstream optical signal according to the short timeslot to obtain a first detection result; the OLT judges, according to the first detection result, whether the upstream optical signal is valid; if so, the OLT constructs a long timeslot and transmits it via the optical transceiver, and controls the optical transceiver to conduct a second SD sampling detection on the upstream optical signal according to the long timeslot to obtain a second detection result; and the OLT determines, according to the second detection result, whether the current PON port is experiencing rogue (Continued)

behaviour. The disclosure achieves quick and accurate detection without occupying fixed bandwidth, thus maximizing the utilization of the upstream bandwidth.

12 Claims, 4 Drawing Sheets (51) Int. Cl.
    *H04B 10/272*     (2013.01)
    *H04Q 11/00*     (2006.01)
    *H04B 10/27*     (2013.01)
    *H04B 10/40*     (2013.01)

(52) U.S. Cl.
    CPC ........... *H04B 10/272* (2013.01); *H04B 10/40* (2013.01); *H04Q 11/0067* (2013.01)

(56) References Cited

U.S. PATENT DOCUMENTS

| | | | | |
|---|---|---|---|---|
| 9,591,386 | B2* | 3/2017 | Eddleston | H04Q 11/0067 |
| 2006/0093356 | A1* | 5/2006 | Vereen | H04L 63/1408 |
| | | | | 398/33 |
| 2007/0237520 | A1* | 10/2007 | DeLew | H04B 10/0799 |
| | | | | 398/17 |
| 2007/0264016 | A1* | 11/2007 | DeLew | H04J 3/0682 |
| | | | | 398/71 |
| 2007/0274719 | A1 | 11/2007 | Ferguson | |
| 2009/0123154 | A1* | 5/2009 | Dalton | H04Q 11/0067 |
| | | | | 398/98 |
| 2012/0163808 | A1* | 6/2012 | Kim | H04Q 11/0067 |
| | | | | 398/30 |
| 2013/0279905 | A1* | 10/2013 | Brown | H03K 5/1252 |
| | | | | 398/37 |
| 2014/0161436 | A1* | 6/2014 | Lee | H04B 10/03 |
| | | | | 398/1 |
| 2014/0270768 | A1* | 9/2014 | Yoo | H04Q 11/0067 |
| | | | | 398/58 |
| 2014/0369681 | A1* | 12/2014 | Smith | H04B 10/0705 |
| | | | | 398/27 |
| 2016/0226618 | A1* | 8/2016 | Lee | H04J 14/0282 |
| 2016/0285546 | A1* | 9/2016 | Zeng | H04B 10/07 |
| 2017/0005722 | A1* | 1/2017 | Huang | H04B 10/272 |
| 2017/0142506 | A1* | 5/2017 | Eddleston | H04Q 11/0067 |

FOREIGN PATENT DOCUMENTS

| | | |
|---|---|---|
| CN | 102075244 A | 5/2011 |
| WO | 2013140454 A1 | 3/2012 |

* cited by examiner

METHOD AND DEVICE FOR DETECTING ROGUE BEHAVIOR

Technical Field

The embodiments of the disclosure relate to the field of communications, and in particular to a method for detecting rogue behaviour and a device for detecting rogue behaviour.

Background

Figure 1:
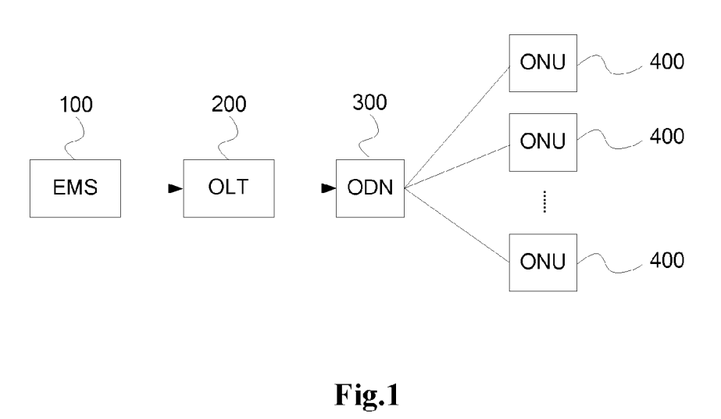
FIG. 1 is a networking structure diagram of a PON system according to conventional art.

In a Passive Optical Network (PON) operation network, the common networking system is as shown in FIG. 1 (FIG. 1 is a structure diagram of a PON system according to conventional art), which consists of an Equipment Management Server (EMS), an Optical Line Terminal (OLT), an Optical Distribution Network (ODN) and a plurality of Optical Network Units (ONUs). The transmission direction from OLT to ONU is called a downstream direction while the transmission direction from ONU to OLT is called an upstream direction, to realize data service and configuration management and other functions.

As a point-to-multipoint topological structure, the PON network transmits data in the downstream direction adopting a broadcast mode and in the upstream direction adopting a Time Division Multiplexing (TDM) mode; the ONU must send an upstream burst signal according to an upstream Bandwidth Map (Bwmap) allocated by the OLT; therefore, in the upstream direction both OLT and ONU must ensure that conflict never appears. Since the ONU sends an upstream burst signal, the ONU turns on an optical transceiver once the OLT allocates a Bwmap to the ONU, and turns off the optical transceiver after the transmission is complete.

During PON projection applications, an upstream optical signal conflict might appear when the ONU optical transceiver is aged or the power supply to the optical transceiver is unstable, or the ONU optical transceiver is not turned off immediately due to some other reasons, or the ONU continues to send upstream signals beyond the given bandwidth timeslot. The strength of the signal sent by the conflict ONU when reaching the OLT, the Extinction Ratio (ER) supported by the OLT optical transceiver and other factors probably could cause an impossibility of the OLT to parse upstream signals, thereby causing an impossibility of other affected ONUs to send signals normally; at this time, if a Loss of signal for ONUi (LOSi)/Loss of Frame of ONUi (LOFi) alarm is detected at the OLT side, part or all ONUs might go offline and meanwhile services interruption might occur.

The above phenomenon is the so called rogue behavior occurred in a PON network, and the ONU which contributes to the phenomenon is called a rogue ONU.

In current PON network applications, the service interruption caused by ONU offline due to rogue behavior is a critical fault; it is needed to detect the rogue behavior phenomenon in time, to locate the specific rogue ONU, to turn off the rogue behaviour and to recover upstream and downstream services, thereby avoiding user complaints.

In a Gigabit Passive Optical Network (GPON) system, the OLT needs to have a function of detecting and processing rogue behavior; it is explicitly regulated in International Telecommunication Union Telecommunication Standardization Sector (ITU-T) G987 protocols that the OLT needs to detect and locate a rogue ONU.

At present, the common method to detect rogue behavior at the OLT side mainly is to perform detection based on RX optical power, that is, the OLT allocates a Transmission Container (T-CONT) which does not belong to any current ONU, and gives a trigger pulse to the OLT optical transceiver; after performing an optical power measurement based on the above allocated T-CONT, the OLT optical transceiver provides an optical power value through an Intelligent Interface Controller (I2C). In the scene of no rogue behavior, there is no upstream signal sent in the above bandwidth, thus the measured optical power value generally is equal to or close to 0. The OLT will set a threshold (generally, 1 to 2 uw) according to specific optical transceiver models; if the optical power value continuously measured for many times exceed this threshold, it is judged that there is rogue behavior, it is needed to further locate the specific rogue ONU.

Although the above method for detecting rogue behaviour is easy to implement and convenient to operate, it still has following problems to be solved.

(1) Detection result lacks reliability. First, optical power measurement has some error or fluctuation, which relates not only to the measurement precision of the optical signal receiver of the OLT optical transceiver, but also to the setting of the Received Signal Strength Indication (RSSI) timing parameter, even to the stability of clock signal, and meanwhile to the stability of upstream signal of the ONU optical transceiver and the start time Ton of the optical transceiver. Next, it is judged through a special threshold whether rogue behavior appears; this threshold, as an empirical value obtained through tests, is less rigorous; thus, certain number of measurements is needed inevitably, and this number also is an empirical value; the combination of the two empirical values further reduces the accuracy of the measurement result.

(2) Detection process is time consuming. First, performing optical power detection through the optical transceiver needs some time; specifically, after a trigger pulse is given, the optical transceiver cannot start optical power measurement without some time delay; second, after the optical power measurement is finished, reading the power value through I2C also needs some time; finally, to consider that the detection result lacks reliability, it is needed to conduct dozens of tests to ensure the relative accuracy, which is more time consuming.

(3) Upstream bandwidth resource is occupied. During the optical power measurement, it is needed to configure an extra T-CONT, which is 10M generally. In this way, the upstream bandwidth is reduced, the number of mounted users is impacted and the Average Revenue Per User (ARPU) value of operator is reduced.

To sum up, in existing PON networking scenes, the above method for detecting rogue behaviour has inevitable defects and limits such as low reliability, long detection time and occupying upstream bandwidth resources, which needs to be solved.

In view of the problem in conventional art that the optical power based method for detecting rogue behaviour has problems such as low reliability, long detection time and occupying upstream bandwidth resources, there is no effective solution so far.

SUMMARY

The embodiment of the disclosure provides a method for detecting rogue behaviour and a device for detecting rogue behaviour, to at least solve the above problems.

According to one embodiment of the disclosure, a method for detecting rogue behaviour is provided, including: for the upstream optical signal of each PON port, an OLT constructs a short timeslot and transmits it via an optical transceiver; the OLT controls the optical transceiver to conduct a first Signal Detect (SD) sampling detection on the upstream optical signal according to the short timeslot to obtain a first detection result; the OLT judges, according to the first detection result, whether the upstream optical signal is valid; if so, the OLT constructs a long timeslot and transmits it via the optical transceiver, and controls the optical transceiver to conduct a second SD sampling detection on the upstream optical signal according to the long timeslot to obtain a second detection result; and the OLT determines, according to the second detection result, whether the current PON port is experiencing rogue behaviour.

In an embodiment of the disclosure, the step that an OLT constructs a short timeslot and transmits it via an optical transceiver includes: after constructing a short timeslot, the OLT inserts the short timeslot into a downstream bandwidth timeslot to transmit via the optical transceiver, wherein the short timeslot does not belong to any ONU and is transmitted once during each time of detection.

In an embodiment of the disclosure, the step that the OLT constructs a long timeslot and transmits it via the optical transceiver includes: after constructing a long timeslot, the OLT inserts the long timeslot into a downstream bandwidth timeslot to transmit via the optical transceiver, wherein the long timeslot is an entire frame and is transmitted once during each time of detection.

In an embodiment of the disclosure, if the judgement result is negative, the method further includes: the OLT continues to construct a short timeslot and transmit it via the optical transceiver, and controls the optical transceiver to conduct a third SD sampling detection on the upstream optical signal according to the short timeslot to obtain a third detection result.

In an embodiment of the disclosure, the step that the OLT determines whether the current PON port is experiencing rogue behaviour according to the second detection result includes: the OLT judges whether the upstream optical signal is valid according to the second detection result; if so, the OLT determines that the current PON port is experiencing rogue behaviour; otherwise, the OLT determines that the current PON port is experiencing upstream drift of window.

In an embodiment of the disclosure, when it is determined that the current PON port is experiencing rogue behaviour, the first determination result indicating that the current PON port is experiencing rogue behaviour is reported to an EMS; when it is determined that the current PON port is experiencing upstream drift of window, the second determination result indicating that the current PON port is experiencing upstream drift of window is reported to the EMS.

According to another embodiment of the disclosure, a device for detecting rogue behaviour is provided, which is located at an OLT, including: a construction component, which is configured to construct a short timeslot and transmit it via an optical transceiver, for the upstream optical signal of each PON port; a control component, which is configured to control the optical transceiver to conduct a first SD sampling detection on the upstream optical signal according to the short timeslot to obtain a first detection result; a processing component, which is configured to: judge whether the upstream optical signal is valid according to the first detection result; if so, construct a long timeslot and transmit it via the optical transceiver, and control the optical transceiver to conduct a second SD sampling detection on the upstream optical signal according to the long timeslot to obtain a second detection result; and a determination component, which is configured to determine whether the current PON port is experiencing rogue behaviour according to the second detection result.

In an embodiment of the disclosure, the construction component includes: a first construction unit, which is configured to construct a short timeslot; a first transmitting unit, which is configured to insert the short timeslot into a downstream bandwidth timeslot to transmit via the optical transceiver, wherein the short timeslot does not belong to any ONU and is transmitted once during each time of detection.

In an embodiment of the disclosure, the processing component includes: a second construction unit, which is configured to construct a long timeslot; a second transmitting unit, which is configured to insert the long timeslot into a downstream bandwidth timeslot to transmit via the optical transceiver, wherein the long timeslot is an entire frame and is transmitted once during each time of detection.

In an embodiment of the disclosure, the construction component is further configured to continue to construct a short timeslot and transmit it via the optical transceiver, if the judgement result of the processing component is negative; the control component is further configured to control the optical transceiver to conduct a third SD sampling detection on the upstream optical signal according to the short timeslot to obtain a third detection result.

In an embodiment of the disclosure, the determination component includes: a judgment unit, which is configured to judge whether the upstream optical signal is valid according to the second detection result; a determination unit, which is configured to determine that the current PON port is experiencing rogue behaviour if the judgement result of the judgement unit is positive, and to determine that the current PON port is experiencing upstream drift of window if the judgement result of the judgement unit is negative.

In an embodiment of the disclosure, the device further includes: a reporting component, which is configured to: when it is determined that the current PON port is experiencing rogue behaviour, report the first determination result indicating that the current PON port is experiencing rogue behaviour to an EMS; when it is determined that the current PON port is experiencing upstream drift of window, report the second determination result indicating that the current PON port is experiencing upstream drift of window to the EMS.

By constructing and transmitting short timeslot bandwidth and long timeslot bandwidth, performing SD sampling on the upstream optical signal and then judging whether rogue behavior appears according to the validity of the SD signal, the embodiment of the disclosure solves the problem in conventional art that the optical power based method for detecting rogue behaviour has problems such as low reliability, long detection time and occupying upstream bandwidth resources, avoids the unstable detection result due to the optical power based detection, achieves quick and accurate detection with high reliability and without occupying fixed bandwidth, and maximizes the utilization of the upstream bandwidth.

BRIEF DESCRIPTION OF THE DRAWINGS

For a better understanding of the disclosure, accompanying drawings described hereinafter are provided to constitute one part of the application; the schematic embodiments of the disclosure and the description thereof are used to illustrate the disclosure but to limit the disclosure improperly. In the accompanying drawings.

DETAILED DESCRIPTION OF THE EMBODIMENTS

The disclosure is described below in detail by reference to the accompanying drawings in conjunction with embodiments. It should be noted that the embodiments in the application and the characteristics of the embodiments can be combined if no conflict is caused.

In order to solve the above technical problem, the disclosure mainly provides a method for implementing detection of rogue behaviour in a PON network, particularly in a Gigabit PON device and an ONU unit.

Figure 2:
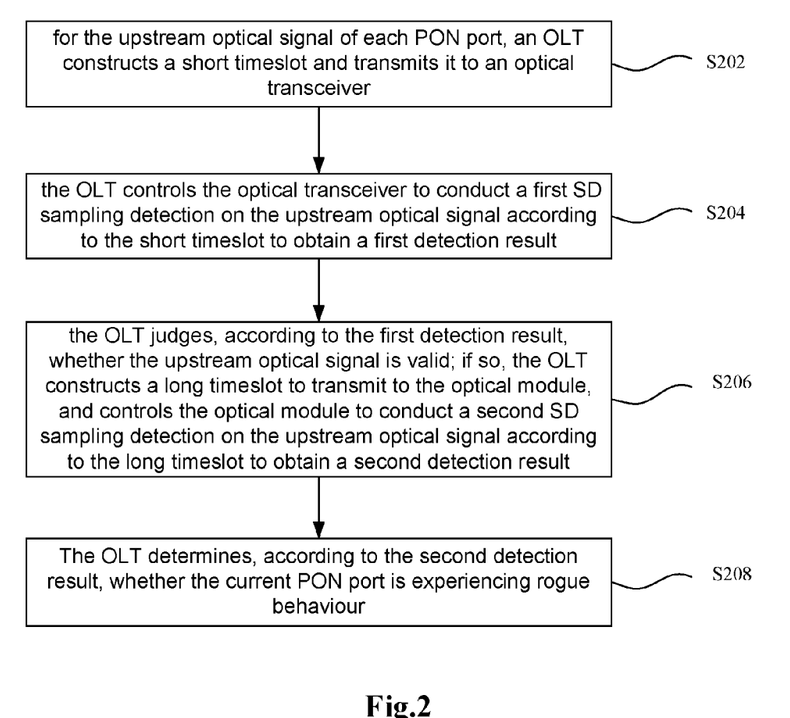
FIG. 2 is a flowchart of a method for detecting rogue behaviour according to the embodiment of the disclosure.

The embodiment of the disclosure provides a method for detecting rogue behaviour. FIG. 2 is a flowchart of a method for detecting rogue behaviour according to the embodiment of the disclosure; as shown in FIG. 2, the method mainly includes the following steps (S202 to S208):

S202: for the upstream optical signal of each PON port, an OLT constructs a short timeslot and transmits it to an optical transceiver.

S204: the OLT controls the optical transceiver to conduct a first SD sampling detection on the upstream optical signal according to the short timeslot to obtain a first detection result. S206: the OLT judges, according to the first detection result, whether the upstream optical signal is valid; if so, the OLT constructs a long timeslot and transmits it via the optical transceiver, and controls the optical transceiver to conduct a second SD sampling detection on the upstream optical signal according to the long timeslot to obtain a second detection result.

S208: the OLT determines, according to the second detection result, whether the current PON port is experiencing rogue behaviour.

Through the above steps of constructing and transmitting short timeslot bandwidth and long timeslot bandwidth, performing SD sampling on the upstream optical signal and then judging whether rogue behavior appears according to the validity of the SD signal, this embodiment can avoid the unstable detection result due to the optical power based detection and achieve quick and accurate detection with high reliability.

In S202 of this embodiment, the step that an OLT constructs a short timeslot and transmits it via an optical transceiver can be implemented through the following scheme: after constructing a short timeslot, the OLT inserts the short timeslot into a downstream bandwidth timeslot to transmit via the optical transceiver, wherein the short timeslot does not belong to any ONU and is transmitted once during each time of detection. During actual applications, the short timeslot may be dozens of bytes.

In S206 of this embodiment, the step that the OLT constructs a long timeslot and transmits it via the optical transceiver can be implemented through the following scheme: after constructing a long timeslot, the OLT inserts the long timeslot into a downstream bandwidth timeslot to transmit via the optical transceiver, wherein the long timeslot is an entire frame and is transmitted once during each time of detection.

In this embodiment, in the condition that the OLT judges that the upstream optical signal is invalid according to the first detection result, the OLT can continue to construct a short timeslot and transmit it via the optical transceiver, and control the optical transceiver to conduct a third SD sampling detection on the upstream optical signal according to the short timeslot to obtain a third detection result. Through this scheme, the first detection result can be verified.

In this embodiment, S208 can be implemented through the following scheme: the OLT judges whether the upstream optical signal is valid according to the second detection result; if so, the OLT determines that the current PON port is experiencing rogue behaviour; otherwise, the OLT determines that the current PON port is experiencing upstream drift of window.

In this embodiment, when it is determined that the current PON port is experiencing rogue behavior, the first determination result indicating that the current PON port is experiencing rogue behaviour can be reported to an EMS; when it is determined that the current PON port is experiencing upstream drift of window, the second determination result indicating that the current PON port is experiencing upstream drift of window can be reported to the EMS.

During actual applications, to more accurately verify the above detection result, a further entire SD signal detection process can be adopted.

Figure 3:
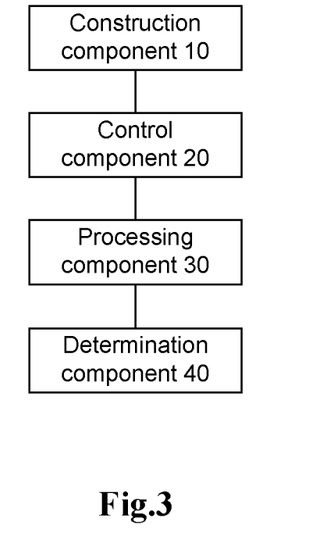
FIG. 3 is a structure diagram of a device for detecting rogue behaviour according to the embodiment of the disclosure.

The embodiment of the disclosure provides a device for detecting rogue behaviour, which is located at an OLT to implement the above method for detecting rogue behaviour. FIG. 3 is a structure diagram of a device for detecting rogue behaviour according to the embodiment of the disclosure; as shown in FIG. 3, the device mainly includes: a construction component 10, a control component 20, a processing component 30 and a determination component 40, wherein the construction component 10 is configured to construct a short timeslot and transmit it via an optical transceiver, for the upstream optical signal of each PON port; the control component 20 is configured to control the optical transceiver to conduct a first SD sampling detection on the upstream optical signal according to the short timeslot to obtain a first detection result; the processing component 30 is configured to: judge whether the upstream optical signal is valid according to the first detection result; if so, construct a long timeslot and transmit it via the optical transceiver, and control the optical transceiver to conduct a second SD sampling detection on the upstream optical signal according to the long timeslot to obtain a second detection result; the determination component 40 is configured to determine whether the current PON port is experiencing rogue behavior according to the second detection result.

Figure 4:
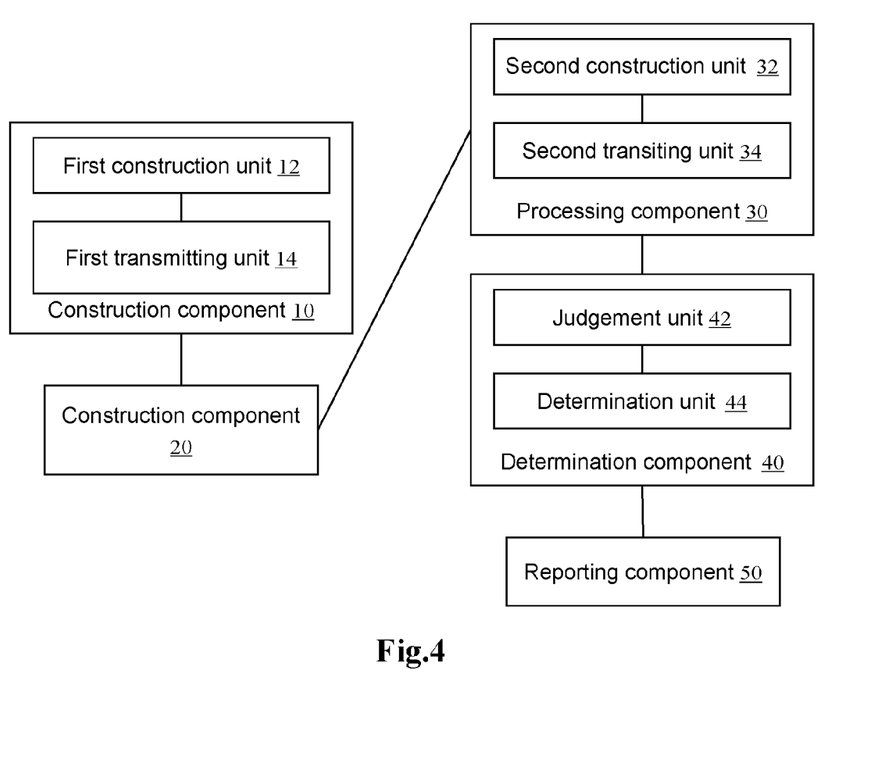
FIG. 4 is a structure diagram of a preferred device for detecting rogue behaviour according to the embodiment of the disclosure.

On the basis of the device for detecting rogue behaviour shown in FIG. 3, the embodiment of the disclosure further provides a preferred device for detecting rogue behaviour. FIG. 4 is a structure diagram of a preferred device for detecting rogue behaviour according to the embodiment of the disclosure; as shown in FIG. 4, in the preferred device for detecting rogue behaviour, the construction component 10 might further include: a first construction unit 12, which is configured to construct a short timeslot; a first transmitting unit 14, which is configured to insert the short timeslot into a downstream bandwidth timeslot to transmit via the optical transceiver, wherein the short timeslot does not belong to any ONU and is transmitted once during each time of detection.

In the preferred device for detecting rogue behaviour, the processing component 30 might further include: a second construction unit 32, which is configured to construct a long timeslot; a second transmitting unit 34, which is configured to insert the long timeslot into a downstream bandwidth timeslot to transmit via the optical transceiver, wherein the long timeslot is an entire frame and is transmitted once during each time of detection.

In the preferred device for detecting rogue behaviour, the construction component 10 might be further configured to continue to construct a short timeslot and transmit it via the optical transceiver, if the judgement result of the processing component 30 is negative; the control component 20 is further configured to control the optical transceiver to conduct a third SD sampling detection on the upstream optical signal according to the short timeslot to obtain a third detection result.

In the preferred device for detecting rogue behaviour, the determination component 40 might further include: a judgment unit 42, which is configured to judge whether the upstream optical signal is valid according to the second detection result; a determination unit 44, which is configured to determine that the current PON port is experiencing rogue behaviour if the judgement result of the judgement unit is positive, and to determine that the current PON port is experiencing upstream drift of window if the judgement result of the judgement unit is negative.

In an embodiment of the disclosure, the preferred device for detecting rogue behaviour might further include: a reporting component 50, which is configured to: when it is determined that the current PON port is experiencing rogue behaviour, report the first determination result indicating that the current PON port is experiencing rogue behaviour to an EMS; when it is determined that the current PON port is experiencing upstream drift of window, report the second determination result indicating that the current PON port is experiencing upstream drift of window to the EMS.

The method for detecting rogue behaviour and device provided in the above embodiment can avoid the unstable detection result due to the optical power based detection, achieve quick and accurate detection with high reliability and without occupying fixed bandwidth, and maximize the utilization of the upstream bandwidth.

Figure 5:
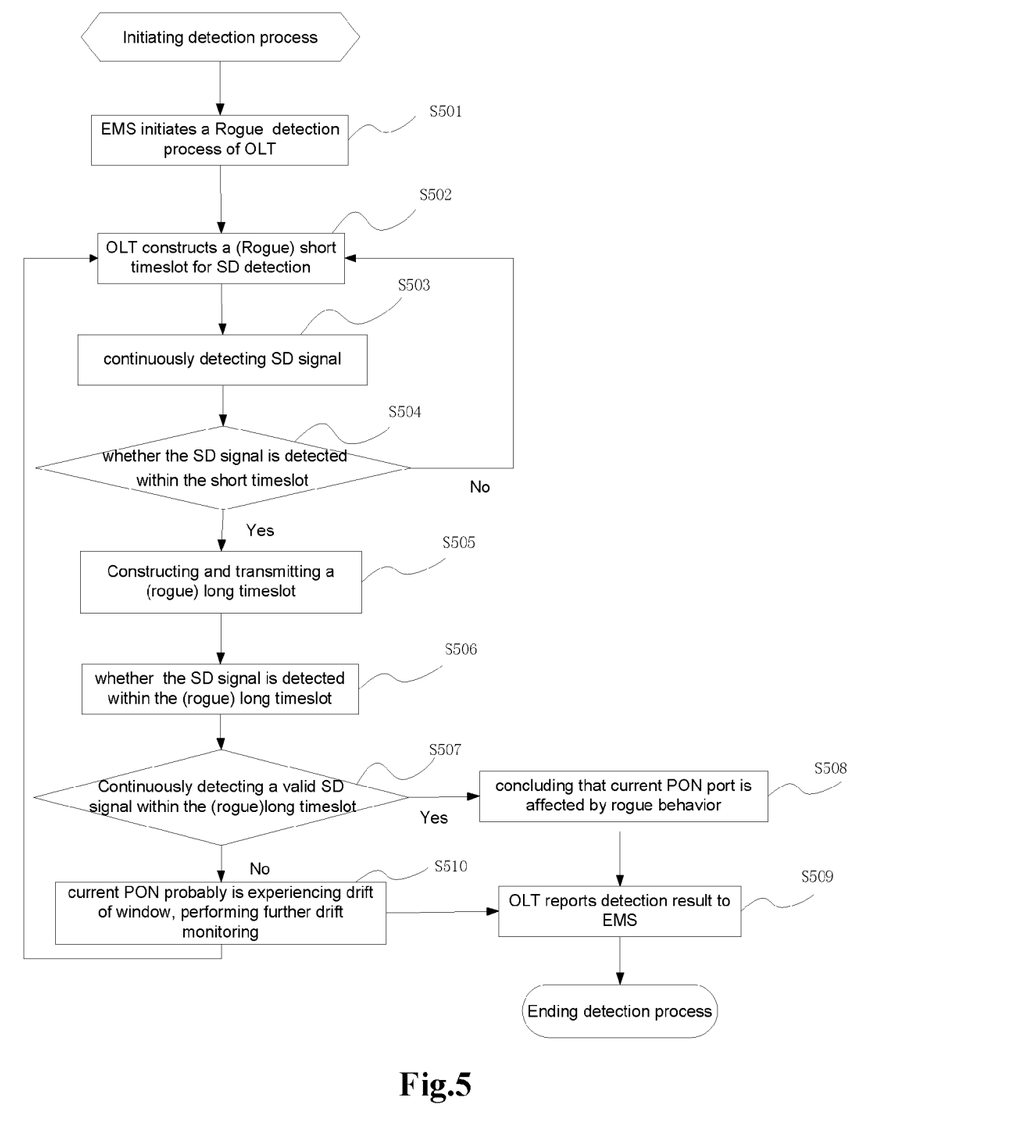
FIG. 5 is flowchart of a method for detecting rogue behaviour according to the preferred embodiment of the disclosure.

To better illustrate the implementation of the above embodiments, a further detailed description is provided below for the method for detecting rogue behaviour and device provided in the above embodiments in conjunction with FIG. 1 and FIG. 5 and preferred embodiments.

First, it should be noted that the hardware system to implement the method for detecting rogue behaviour provided in the embodiment of the disclosure is the same as that in the conventional art. Here, please refer to FIG. 1, the system includes: EMS100, OLT200, ODN300 and ONU400, in which the EMS100 is configured to transmit "initiating rogue behavior detection process" to the OLT200, the OLT200 is configured to transmit a bandwidth timeslot for detection during the rogue behaviour detection, and meanwhile to control an optical transceiver to conduct SD real-time sampling on the upstream data and judge whether rogue behaviour appears, the ODN300 is configured to connect with a plurality of ONUs400 under the OLT200, as a direct physical connection channel between the OLT200 and the ONU400, the ONU400 is configured to act as a possible rogue ONU.

On the basis of this hardware, in view of the rogue behavior detection process initiated at the OLT side to conduct detection on the upstream optical signal of each PON port respectively, a brief introduction is provided below to the implementation of the method for detecting rogue behaviour provided in the embodiment of the disclosure: (1) the OLT constructs a short timeslot and inserts it into a downstream BWMAP to transmit, for SD signal detection, wherein this timeslot does not belong to any ONU, with dozens of bytes, and is transmitted once during each time of detection; (2) the OLT controls an optical transceiver to conduct continuous SD sampling on the upstream data according to the short timeslot, and the optical transceiver reports the SD sampling result to the OLT, then the OLT judges whether the upstream optical signal (also called SD signal) is valid; if valid, the OLT continues to construct a long timeslot and inserts it into a downstream BWMAP to transmit, so as to verify the short timeslot detection result, wherein this long timeslot is an entire frame and is transmitted once during each time of detection; if invalid, the OLT continues to construct a short timeslot to conduct detection again; (3) the optical transceiver reports the SD sampling result based on the long timeslot to the OLT; if the OLT judges that the SD signal is valid, it is indicated that the current OLT PON port is experiencing rogue behaviour and the result is reported to the EMS; if the OLT judges that the SD signal is invalid, it is indicated the current OLT PON port is experiencing upstream drift of window and the detection result is reported to the EMS; meanwhile, for further verification of the result, it is needed to conduct an entire SD signal detection process again; (4) after the rogue behavior detection process is ended, it is needed to further locate the specific rogue ONU.

The method for detecting rogue behaviour provided in the preferred embodiment is further described below in conjunction with FIG. 5. FIG. 5 is flowchart of a method for detecting rogue behaviour according to the preferred embodiment of the disclosure. As shown in FIG. 5, the process includes the following steps:

S501: an EMS controls an OLT to initiate a rogue behavior detection process, to conduct detection on the upstream optical signal of each PON port respectively.

S502: the OLT constructs a short timeslot and inserts it into a downstream BWMAP to transmit, for upstream SD signal detection, wherein this timeslot does not belong to any ONU, with dozens of bytes, and is transmitted once during each time of detection, without occupying OLT physical bandwidth.

S503: the OLT controls an optical transceiver to conduct continuous SD sampling on the upstream data according to the short timeslot and inputs a corresponding RSSI timing parameter, including DELAY and sampling WIDTH.

S504: the optical transceiver reports the SD sampling result to the OLT, which then judges whether the SD signal is valid; if valid, enter S505; if invalid, enter S502.

S505: the OLT continues to construct a long timeslot and inserts it into a downstream BWMAP to transmit, so as to verify the short timeslot detection result, wherein this long timeslot may be an entire frame and is transmitted once during each time of detection.

S506: the OLT controls the optical transceiver to conduct continuous SD sampling on the upstream data according to the long timeslot and inputs a corresponding RSSI timing parameter, including DELAY and sampling WIDTH.

S507: the optical transceiver reports the SD sampling result based on the long timeslot to the OLT; if the OLT judges that the SD signal is valid, enter S508; if the OLT judges that the SD signal is invalid, enter S510.

S508: the OLT judges that the current OLT PON port is experiencing rogue behaviour according to the SD detection result.

S509: the OLT reports the rogue behaviour detection result; the detection process is ended.

S510: the current OLT PON port probably is experiencing upstream drift of window, and the detection result is reported to the EMS; meanwhile, for further verification of the result, it is needed to conduct an entire SD signal detection process again; return to S502.

Through the implementation of this preferred embodiment, it can be quickly and accurately judged whether a fault is due to rogue behaviour; on the premise that the SD signal is valid, it can be directly judged that there is rogue behaviour, without repeated detections; this embodiment occupies no fixed bandwidth, maximizes the utilization of upstream bandwidth and meets the interest needs of users.

It should be noted that each of the above components can be realized through hardware, for example, a processor includes each of the above components, or, each of the above components is arranged in a processor respectively.

In another embodiment, software is provided, which is configured to implement the technical scheme described in the above embodiment and preferred embodiment.

In another embodiment, a storage medium is provided, which stores the above software, wherein the storage medium includes but not limited to: compact disc, floppy disk, hardware, erasable memory and the like.

From the above description it can be seen that the disclosure achieves the following technical effects: an SD signal sampling method is adopted to detect and determine upstream rogue behaviour in real time, without relying on the common optical power detection, which has higher reliability and accuracy; if in current network applications part or all ONUs go offline and wideband services are interrupted under a PON port, it can be quickly and accurately judged whether the fault is due to rogue behaviour; on the premise that the SD signal is judged to be valid, it can be directly determined that there is rogue behaviour, without repeated detections; the detection efficiency and detection time are superior to the optical power detection method; meanwhile, since this detection mechanism does not occupy the fixed bandwidth when started, the utilization of upstream bandwidth is maximized and the interest needs of users are satisfied.

Obviously, those skilled in the art should understand that the components or steps described above can be implemented by a common computer device; the components or steps can be integrated on a single computing device or distributed on a network composed of a plurality of computing devices; optionally, the components or steps can be implemented by a programming code executable by a computing device, thus they can be stored in a storage device to be executed by a computing device and executed in a different order in some cases, or manufactured into individual integrated circuit component respectively, or several of them can be manufactured into a single integrated circuit component to implement; in this way, the disclosure is not limited to any combination of specific hardware and software.

The above are only the preferred embodiments of the disclosure and not intended to limit the disclosure. For those skilled in the art, various modifications and changes can be made to the disclosure. Any modification, equivalent substitute and improvement made within the spirit and principle of the disclosure are intended to be included within the scope of protection of the disclosure.

INDUSTRIAL APPLICABILITY

The above technical scheme provided by the disclosure can be applied to a rogue behaviour detection process, and, by constructing and transmitting short timeslot bandwidth and long timeslot bandwidth, performing SD sampling on the upstream optical signal and then judging whether rogue behavior appears according to the validity of the SD signal, solves the problem in conventional art that the optical power based method for detecting rogue behaviour has problems such as low reliability, long detection time and occupying upstream bandwidth resources, avoids the unstable detection result due to the optical power based detection, achieves quick and accurate detection with high reliability and without occupying fixed bandwidth, and maximizes the utilization of the upstream bandwidth.

What is claimed is:

1. A method for detecting rogue behaviour, comprising:
   for the upstream optical signal of each Passive Optical Network (PON) port, constructing and transmitting via an optical transceiver a short timeslot, by an Optical Line Terminal (OLT);
   controlling, by the OLT, the optical transceiver to conduct a first Signal Detect (SD) on the upstream optical signal according to the short timeslot to obtain a first detection result, wherein the first SD comprises a sampling detection;
   judging, by the OLT, whether the upstream optical signal is valid according to the first detection result; in a case that the upstream optical signal is valid, constructing and transmitting via the optical transceiver a long timeslot, by the OLT, and, controlling, by the OLT, the optical transceiver to conduct a second SD on the upstream optical signal according to the long timeslot to obtain a second detection result, wherein the second SD comprises the sampling detection; and
   determining, by the OLT, whether the current PON port is experiencing rogue behavior according to the second detection result.

2. The method as claimed in claim 1, wherein constructing and transmitting via an optical transceiver a short timeslot by an OLT comprises:
   after constructing a short timeslot, inserting, by the OLT, the short timeslot into a downstream bandwidth timeslot to transmit via the optical transceiver, wherein the short timeslot does not belong to any Optical Network Unit (ONU) and is transmitted once during each time of detection.

3. The method as claimed in claim 1, wherein constructing and transmitting via the optical transceiver a long timeslot by an OLT comprises:
   after constructing a long timeslot, inserting, by the OLT, the long timeslot into a downstream bandwidth timeslot to transmit via the optical transceiver, wherein the long timeslot is an entire frame and is transmitted once during each time of detection.

4. The method as claimed in claim 1, wherein in a case that the upstream optical signal is not valid, the method further comprises:
   continuing to construct and transmit via the optical transceiver one short timeslot, by the OLT, and, controlling, by the OLT, the optical transceiver to conduct a third SD sampling detection on the upstream optical signal according to the one short timeslot to obtain a third detection result, wherein the third SD comprises a sampling detection.

5. The method as claimed in claim 1, wherein determining, by the OLT, whether the current PON port is experiencing rogue behaviour according to the second detection result comprises:
judging, by the OLT, whether the upstream optical signal is valid according to the second detection result; in a case that the upstream optical signal is valid, determining, by the OLT, that the current PON port is experiencing rogue behavior; in a case that the upstream optical signal is not valid, determining, by the OLT, that the current PON port is experiencing upstream drift of window.

6. The method as claimed in claim 5, further comprising:
in a case that it is determined that the current PON port is experiencing rogue behaviour, reporting a first determination result indicating that the current PON port is experiencing rogue behaviour to an Equipment Management System (EMS);
in a case that it is determined that the current PON port is experiencing upstream drift of window, reporting a second determination result indicating that the current PON port is experiencing upstream drift of window to the EMS.

7. A device for detecting rogue behaviour, which is located at an Optical Line Terminal (OLT), comprising:
a construction component, which is configured to construct a short timeslot and transmit short timeslot via an optical transceiver, for the upstream optical signal of each Passive Optical Network (PON) port;
a control component, which is configured to control the optical transceiver to conduct a first Signal Detect (SD) sampling detection on the upstream optical signal according to the short timeslot to obtain a first detection result;
a processing component, which is configured to: judge whether the upstream optical signal is valid according to the first detection result; if so, construct a long timeslot and transmit it via the optical transceiver, and control the optical transceiver to conduct a second SD sampling detection on the upstream optical signal according to the long timeslot to obtain a second detection result; and
a determination component, which is configured to determine whether the current PON port is experiencing rogue behaviour according to the second detection result.

8. The device as claimed in claim 7, wherein the construction component comprises:
a first construction unit, which is configured to construct a short timeslot;
a first transmitting unit, which is configured to insert the short timeslot into a downstream bandwidth timeslot to transmit via the optical transceiver, wherein the short timeslot does not belong to any Optical Network Unit (ONU) and is transmitted once during each time of detection.

9. The device as claimed in claim 7, wherein the processing component comprises:
a second construction unit, which is configured to construct a long timeslot;
a second transmitting unit, which is configured to insert the long timeslot into a downstream bandwidth timeslot to transmit via the optical transceiver, wherein the long timeslot is an entire frame and is transmitted once during each time of detection.

10. The device as claimed in claim 7, wherein
the construction component is further configured to continue to construct a short timeslot and transmit it via the optical transceiver, if the judgement result of the processing component is negative;
the control component is further configured to control the optical transceiver to conduct a third SD sampling detection on the upstream optical signal according to the short timeslot to obtain a third detection result.

11. The device as claimed in claim 7, wherein the determination component comprises:
a judgment unit, which is configured to judge whether the upstream optical signal is valid according to the second detection result;
a determination unit, which is configured to determine that the current PON port is experiencing rogue behaviour if the judgement result of the judgement unit is positive, and to determine that the current PON port is experiencing upstream drift of window if the judgement result of the judgement unit is negative.

12. The device as claimed in claim 11, further comprising:
a reporting component, which is configured to: when it is determined that the current PON port is experiencing rogue behaviour, report the first determination result indicating that the current PON port is experiencing rogue behaviour to an Equipment Management System (EMS); when it is determined that the current PON port is experiencing upstream drift of window, report the second determination result indicating that the current PON port is experiencing upstream drift of window to the EMS.

* * * * *